G. F. PERIN.
ELECTRIC LOCOMOTIVE.
APPLICATION FILED MAY 15, 1911.
1,086,396.
Patented Feb. 10, 1914.
3 SHEETS—SHEET 1.
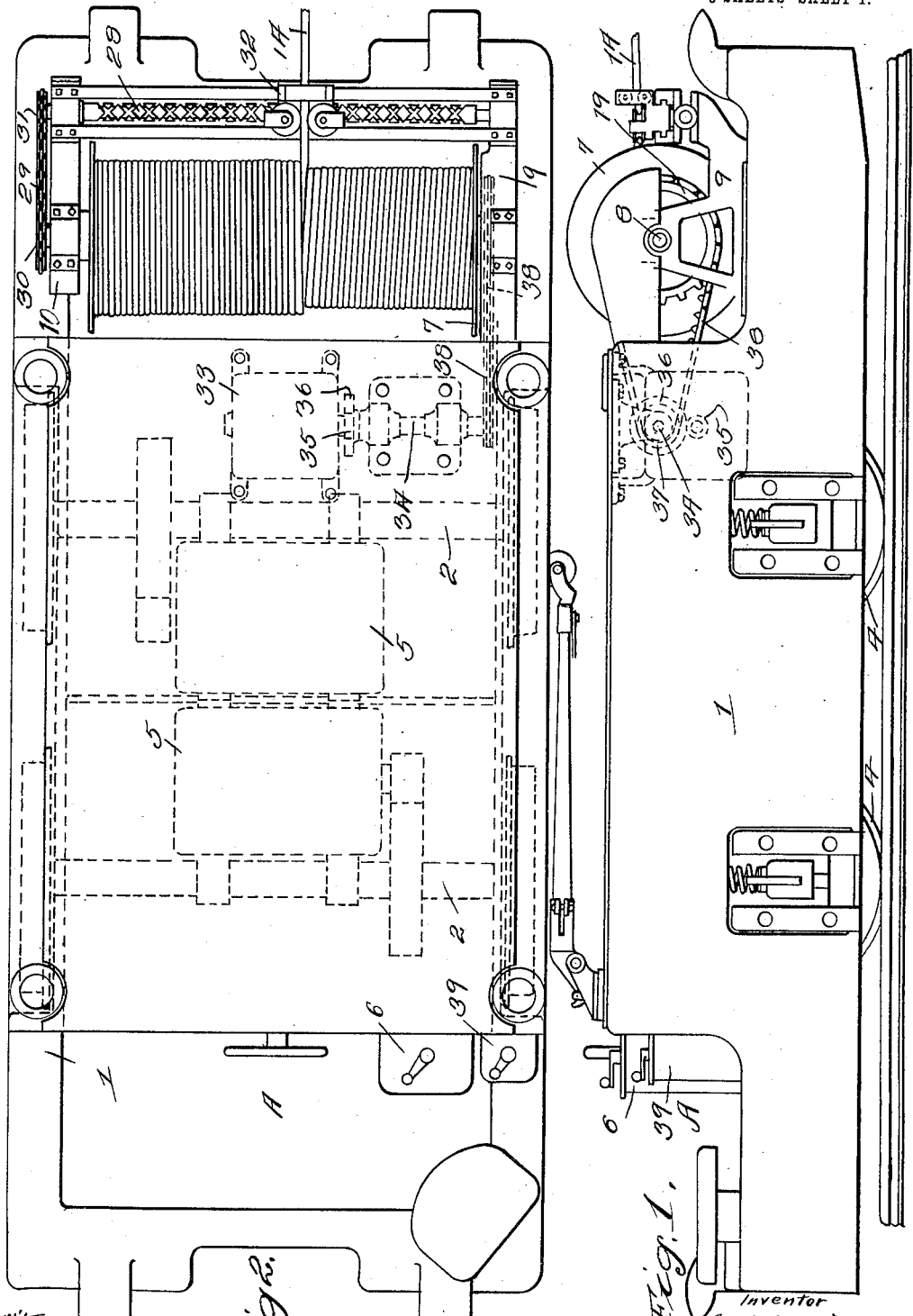

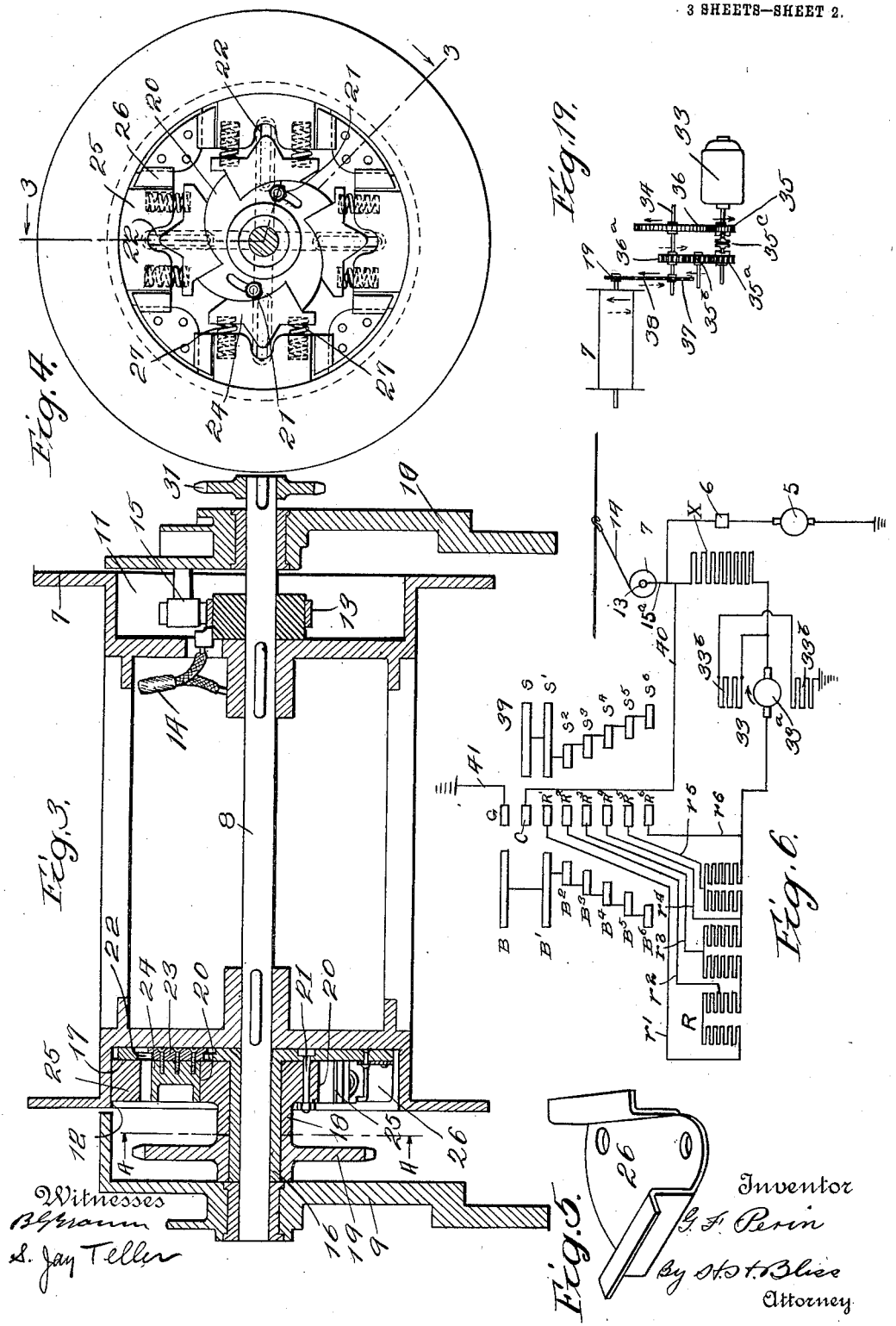

G. F. PERIN.
ELECTRIC LOCOMOTIVE.
APPLICATION FILED MAY 15, 1911.
1,086,396.
Patented Feb. 10, 1914.
3 SHEETS—SHEET 3.
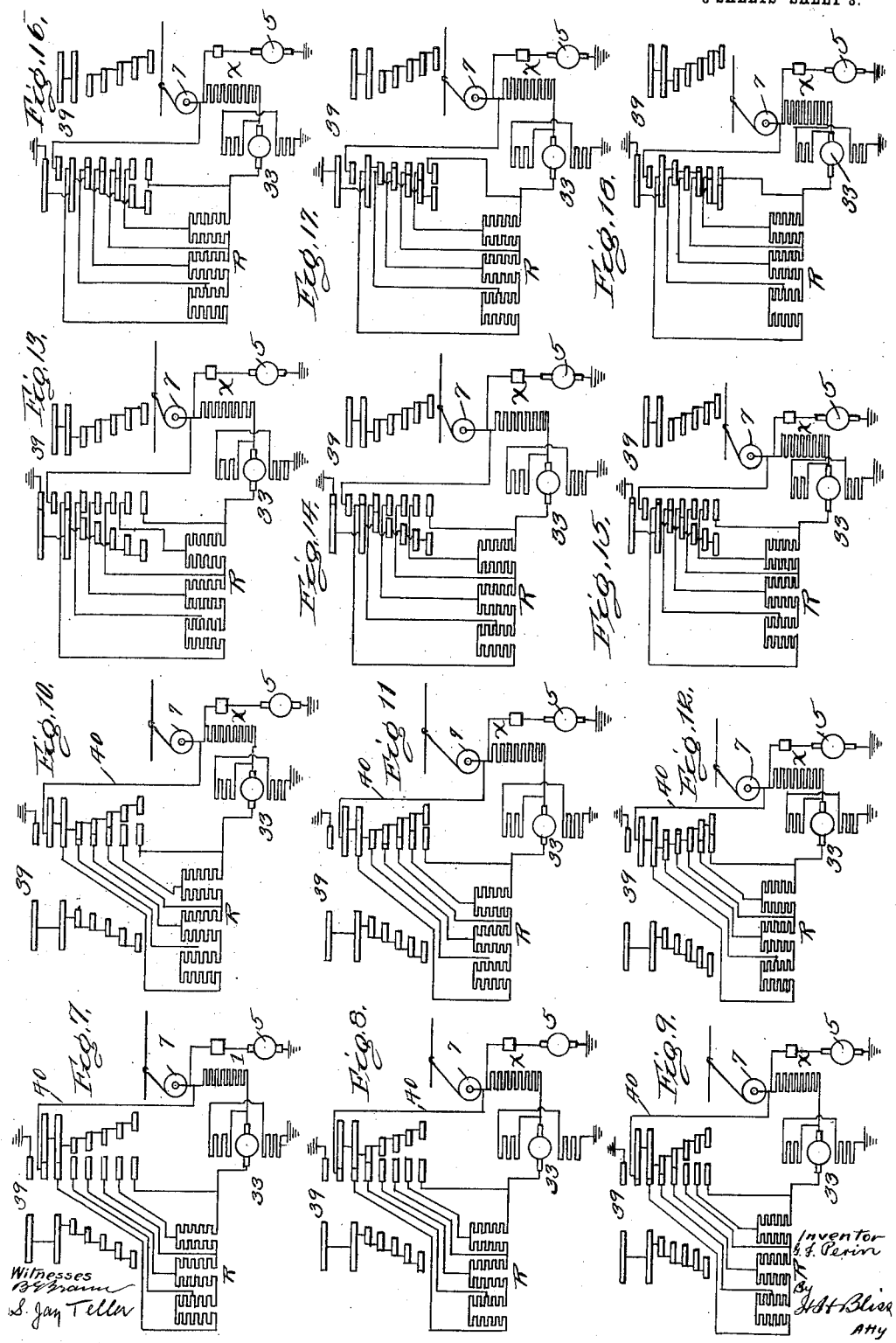

UNITED STATES PATENT OFFICE.

GLOVER F. PERIN, OF BIRMINGHAM, ALABAMA, ASSIGNOR TO THE JEFFREY MANUFACTURING COMPANY, A CORPORATION OF OHIO.

ELECTRIC LOCOMOTIVE.

1,086,396.  Specification of Letters Patent.  Patented Feb. 10, 1914.

Application filed May 15, 1911. Serial No. 627,241.

*To all whom it may concern:*

Be it known that I, GLOVER F. PERIN, a citizen of the United States, residing at Birmingham, in the county of Jefferson and State of Alabama, have invented certain new and useful Improvements in Electric Locomotives, of which the following is a specification, reference being had therein to the accompanying drawing.

This invention relates to improvements in locomotives, and more particularly in that class of locomotives which are adapted for use in and about coal or other similar mines, and which are provided with electric cable reels.

The fundamental features and mode of operation of cable reel or gathering locomotives are now well known, and an extended discussion will therefore be unnecessary. It will be sufficient to point out that locomotives of this class are primarily intended and adapted for entering mine rooms or other places in which tracks are provided, but in which there are no permanent trolley wires or other electric conductors. The cable which is wound upon a rotatable reel on the locomotive is connected at its free end to a trolley wire or other stationary conductor. As the locomotive advances away from the stationary conductor, the cable is unwound from the reel. When the locomotive returns, the cable is rewound upon the reel. Electrical connections with the reel serve to supply current to the locomotive motors at all times.

The object of my present invention is to provide improved means for controlling the rotation of the reel both for winding and for unwinding, including the friction clutch interposed between the reel motor and the reel. Its objects will be more fully apparent from the following specification.

In the accompanying drawings I have shown, for purposes of illustration, one form of my invention which I at present deem preferable. It will be obvious, however, to those skilled in the art, that various changes and modifications within the scope of the appended claims may be made both in the mechanical structure and the electrical connections without departing from the scope of my invention.

Of the drawings Figure 1 is a side elevation of a locomotive embodying my improvements. Fig. 2 is a plan view. Fig. 3 is a vertical cross sectional view through the reel along the line 3—3 of Fig. 4. Fig. 4 is an end view of the reel showing the connections for driving it from the shaft. Fig. 5 is a detail perspective view of one of the clutch shoe guides. Fig. 6 is a diagrammatic view of the electrical connections for the reel motor with the controller in neutral position. Figs. 7 to 12 are diagrammatic views of the electrical connections with the controller in the various positions for regulating the action of the reel motor during winding. Figs. 13 to 18 are diagrammatic views showing the electrical connections with the controller in the various positions for regulating the action of the reel motor during unwinding. Fig. 19 is a diagrammatic view of a modified form of connection between the reel motor and the reel.

Referring to the drawings, A represents the locomotive as a whole. The locomotive is provided with the usual side frames 1, 1, the axles 2, 2, and the track wheels 4, 4.

5, 5 represent the main driving motors which are suitably geared to the axles.

6 represents a controller for the main motors.

7 represents the cable reel which is secured to the shaft 8. The shaft is rotatably mounted in upstanding brackets 9 and 10 on the main locomotive frame. At opposite ends the reel is undercut to provide annular recesses 11 and 12. In one of these recesses as, for instance, 11, is mounted a distributer ring 13 connected with the end of the cable 14. A brush 15 contacts with the distributer ring and takes off current which is led through the conductor 15ª to the main locomotive motors and to the reel motor, which will be hereafter described. On the shaft 8 at the other end of the cable reel there is rotatably mounted a sleeve 16 which is provided at its inner end within the recess 12 of the reel with a radial flange 17. 18 is a second sleeve or cylinder which is journaled on the sleeve 16. This is provided near its outer end with a sprocket wheel 19, and near its inner end with cam bosses 20 which are preferably four in number. Studs 21, 21 are provided on the flange 17 and these extend outward through arcuate slots in the cam bosses. By means of nuts on the ends of the studs 21, 21, the sleeve or cylinder 18, together with the cam bosses, can be locked in adjusted position relative to the inner sleeve 16. The flange 17 is provided with radial T-slots 22 which correspond in number to the cam bosses 20. In each of these slots there is mounted a similarly shaped guide piece 23 which is secured by means of screws, as indicated in the drawings or otherwise, to adjustable abutment blocks 24. By means of this construction the abutment blocks are maintained in position and are guided for radial movement inward or outward.

25, 25 are clutch shoes provided with outer curved surfaces adapted to engage with the cylinder surface at the periphery of the recess 12. These shoes are preferably provided with rabbets at their outer corners. Guides 26, 26, preferably of sheet metal, are secured to the flange 17. These guides engage the sides of the shoes 25, 25 and are provided with outturned edges which lie within the rabbets and prevent the outward movement of the shoes away from the flange 17. A pair of coil springs 27, 27 is provided between each clutch shoe 25 and each abutment block 24. The shoes and blocks are preferably provided with recesses for receiving the springs.

It will be apparent that as the shoes 25, 25 are free to move in their guides, they will be forced outward by their springs 27, 27 into frictional engagement with the cylindrical bearing surfaces on the reel. The action of the springs 27, 27 may be adjusted by loosening the nuts on the studs 21, 21, and rotating the cylinder 18 relatively to the sleeve 16 to throw the abutment blocks 24, 24 outward by means of the cam bosses 20, 20. After the abutment blocks have been moved sufficiently to properly adjust the springs, then they may be retained in adjusted position by tightening the nuts on the studs 21, 21, thus securing the cam bosses against movement in either direction relative to the other clutch parts.

It will be apparent that the clutch mechanism which has been described serves to transmit to the reel power which may be applied to the sprocket 19. The drive is non-positive, and the shoes 25, 25 will slip on the reel bearing surface and prevent the transmission of an excessive amount of power. The point at which slipping will commence may be adjusted by regulating the spring action in the manner which has been described.

28 is a reversely threaded shaft rotatably mounted parallel with the reel and operatively connected therewith by means of a chain 29 which passes over sprocket wheels 30 and 31.

32 is a cable guide mechanism mounted to slide longitudinally of the reel and controlled by the reverse threads of the shaft 28. The shaft 28 is rotated continuously with the reel, and the guide mechanism is reciprocated throughout the length of the reel to control the winding of the cable 14.

33 represents the motor for driving the reel.

34 is a jack shaft driven from the motor 33 by means of the pinion 35 and the gear wheel 36.

37 is a sprocket wheel on the jack shaft 34. A chain 38 passing over the sprocket wheels 37 and 19 serves to transmit power from the jack shaft to the reel.

39 is a controller for the reel motor connected in the manner to be described.

Referring to the diagrams of electrical connections G, C, $R^1$, $R^2$, $R^3$, $R^4$, $R^5$ and $R^6$ represent a series of stationary contacts on the controller 39.

S, $S^1$, $S^2$, $S^3$, $S^4$, $S^5$, and $S^6$ are contacts which are connected together and mounted upon the controller drum. B, $B^1$, $B^2$, $B^3$, $B^4$, $B^5$ and $B^6$ are other contacts also connected together and also mounted upon the drum of the controller.

R represents a resistance element. Connections $r^1$, $r^2$, $r^3$, $r^4$, $r^5$ and $r^6$ are provided between the contacts $R^1$, $R^2$, $R^3$, $R^4$, $R^5$ and $R^6$ and various points along the resistance element whereby various parts of the resistance may be cut into and out of the motor circuit as hereinafter described.

33 represents the motor as a whole, it being provided with the armature $33^a$ and the field windings $33^b$, $33^b$.

X represents a second resistance element having a resistance preferably several times as great as the total resistance of the element R.

As will be noted in the diagrams, a series connection is provided from the cable reel 7 through the resistance X, through the motor and through the resistance R to the controller. The motor field winding is connected at one end to the conductor between the resistance X and the motor armature. The other end of the field winding is grounded. A connection 40 is provided from the cable reel to the contact C of the controller. A connection 41 is provided from the contact G of the controller to the ground.

In operation, assuming that the locomotive is in position with the cable unwound and is about to start in the winding direction, the operator throws the reel motor controller into one or another of the positions indicated in Figs. 7 to 12. It will be noted that in the positions shown in these figures, a circuit is established through the connection 40 to the contact C of the controller, from this contact through more or less of the resistance R to the motor, and from the motor through the field to the ground. The connection through the resistance X provides a short circuit across this current path, but as the resistance of the element X is large as compared with that of the element R and with the motor, the loss of power and of efficiency is small. By changing the controller positions, resistance can be cut into or out of the motor circuit, and the winding torque of the motor controlled as desired. Assuming that the locomotive is in position with the cable wound upon the reel and is about to start in the unwinding direction, then the operator will throw the reel motor controller into one of the positions indicated in the Figs. 13 to 18. When the controller is in any one of these positions, a circuit is established from the cable reel through the resistance element X, through the motor in the opposite direction from that previously described, through more or less of the resistance R to the contact G and to the ground. The tendency, therefore, with the controller in one of these positions is for the motor to rotate in the direction to unwind the cable from the reel. However, on account of the high resistance of the element X, together with the resistance of the motor itself and of more or less of the element R, this tendency of the motor to rotate in the unwinding direction is not quite sufficient to overcome the friction of the parts. Nevertheless, the motor exerts an unwinding torque, and this torque makes it possible for the reel to be started in the unwinding direction by a very slight tension on the cable. By changing the position of the controller, this torque can be regulated in accordance with the mechanical resistance offered so that the reel may be maintained in a condition of substantial balance, ready to start at the slightest cable tension without any objectionable jerking. As has been before pointed out, on account of the high resistance of the element X, the electromotive force impressed upon the motor to drive it in the unwinding direction, is low, and the motor, if freed from all load, would rotate only at a definite relatively slow speed. When the locomotive advances at such a rate that the motor is driven from the reel at a speed in excess of that which it would attain under the influence of the impressed electro-motive force, the motor acts as a dynamo and generates a counter electro-motive force. With the motor acting as a dynamo, power is required to drive it, and this power being derived from the reel, serves to retard it and maintain a proper tension in the cable. When the locomotive is moving in the unwinding direction at a slow speed, then the cable will unwind with practically no tension. Tension is, however, automatically applied as the speed is increased. This automatic retarding of the rotation of the reel, when the reel speed is increased, is particularly advantageous for preventing the continued motion of the reel at a high speed after a sudden jerk on the cable, or when the locomotive speed is being rapidly decelerated.

I am aware that it has been heretofore proposed to provide a separate motor for driving a cable reel, and I am aware that it has been proposed to provide a yieldable connection such as a friction clutch between such an independent motor and the reel. I do not therefore broadly claim this feature as a part of my invention. So far as I am aware, however, in locomotives provided with a motor so connected to the reel as to be capable of being driven by it, no provision has been made for relieving the retarding effect incident to the rotation of the reel motor in the reverse direction against the full electro-motive force of the line. It will be obvious that while it is preferable to reverse the connections for the reel motor at each reversal of travel of the locomotive, the controller may, if desired, be left in position to continuously apply electro-motive force for rotating the motor in the winding direction. When the locomotive is so operated, the friction clutch between the reel motor and the reel acts as a safety device to prevent the transmission to the reel of an undue retarding effect which would subject the cable to too great tension.

In the modified form of connection shown in Fig. 19, I have provided mechanical connections between the reel motor and the reel, which make possible a control of the reel similar to that obtained by means of the electrical connections which have been described. As in the other figures 7 represents the reel, 34 the jack shaft connected with the reel by means of the sprocket wheels 19 and 37 and the chain 38, 33 the reel motor, 36 the gear on the jack shaft 34, and 35 the motor pinion meshing with the gear 36. In this modified construction, however, the pinion 35 is rotatable on the armature shaft of the motor. A similar pinion 35$^a$ is also mounted on the armature shaft. A clutch 35$^c$ is provided for connecting either of the pinions 35 or 35$^a$ with the shaft. The pinion 35$^a$ is connected with the jack shaft 34 through the gear 36$^a$ and the idler pinion 36$^b$.

In operation the line electro-motive force is continually applied to the motor 33 and tends to cause its rotation in the direction indicated by the arrow at the pinion 35. When the clutch 35$^c$ is thrown toward the right to engage the pinion 35, then the parts are driven in the directions indicated by the arrows in full lines to drive the reel in the winding direction. When it is desired to unwind the cable from the reel, then the clutch 35$^c$ is thrown toward the left to engage the pinion 35$^a$. The torque of the motor is in the same direction, but on account of the interposed idler pinion 36ᵇ, the torque is transmitted in the direction indicated by the arrows in dotted lines, to tend to drive the reel in the unwinding direction. On account of the difference in the sizes of the gears 36ᵃ and 36, the torque tending to drive the reel in the unwinding direction is much less than that tending to drive it in the winding direction. By properly proportioning the gearing, the torque transmitted to the reel through the gear 36ᵃ is insufficient to actually rotate it to unwind the cable. The torque serves, however, to maintain the reel in a position of substantial balance and ready to start upon a slight cable tension.

What I claim is:—

1. The combination in an electric locomotive of a main propelling motor, a cable reel, a cable adapted to be wound upon the reel and connected for the transmission of current to the said motor, an independent reel motor, power connections between the reel motor and the reel, manually controllable electrical connections from the cable through the motor for applying electro-motive force tending to cause the rotation of the motor and reel in one direction, and manually controllable electrical connections from the cable through the motor for applying electro-motive force tending to cause the rotation of the motor and reel in the other direction.

2. The combination in an electric locomotive of a main propelling motor, a cable reel, a cable adapted to be wound upon the reel and connected for the transmission of current to the said motor, an independent reel motor, power connections between the reel motor and the reel, electrical connections from the cable through the motor for applying electro-motive force tending to cause the rotation of the motor and reel in one direction, and electrical connections from the cable through the motor for applying a lesser electro-motive force tending to cause the rotation of the motor and reel in the other direction.

3. The combination in an electric locomotive of a main propelling motor, a cable reel, a cable adapted to be wound upon the reel and connected for the transmission of current to the said motor, an independent reel motor, power connections between the reel motor and the reel, electrical connections from the cable through the motor for applying a regulable electro-motive force tending to cause the rotation of the motor and reel in the cable winding direction, and electrical connections from the cable through the motor for applying electro-motive force tending to cause the rotation of the motor and reel in the cable unwinding direction.

4. The combination in an electric locomotive of a main propelling motor, a cable reel, a cable adapted to be wound upon the reel and connected for the transmission of current to the said motor, an independent reel motor, power connections between the reel motor and the reel, electrical connections from the cable through the motor for applying electro-motive force tending to cause the rotation of the motor and reel in the cable winding direction, and electrical connections from the cable through the motor for applying a regulable electro-motive force tending to cause the rotation of the motor and reel in the cable unwinding direction.

5. The combination in an electric locomotive of a main propelling motor, a cable reel, a cable adapted to be wound upon the reel and connected for the transmission of current to the said motor, an independent reel motor, power connections between the reel motor and the reel, electrical connections from the cable through the motor for applying a regulable electro-motive force tending to cause the rotation of the motor and reel in one direction, and electrical connections from the cable through the motor for applying a regulable electro-motive force tending to cause the rotation of the motor and reel in the other direction.

6. The combination in an electric locomotive of a main propelling motor, a cable reel, a cable adapted to be wound upon the reel and connected for the transmission of current to the said motor, an independent reel motor, power connections between the reel motor and the reel, electrical connections from the cable through the motor for applying a regulable electro-motive force tending to cause the rotation of the motor and reel in one direction, and electrical connections from the cable through the motor for applying a lesser electro-motive force tending to cause the rotation of the motor and reel in the other direction.

7. The combination in an electric locomotive of a main propelling motor, a cable reel, a cable adapted to be wound upon the reel and connected for the transmission of current to the said motor, an independent reel motor, power connections between the reel motor and the reel, electrical connections from the cable through the motor for applying electro-motive force tending to cause the rotation of the motor and reel in one direction, and electrical connections from the cable through the motor for applying a regulable lesser electro-motive force tending to cause the rotation of the motor and reel in the other direction.

8. The combination in an electric locomotive of a main propelling motor, a cable reel, a cable adapted to be wound upon the reel and connected for the transmission of current to the said motor, an independent reel motor, power connections between the reel motor and the reel, electrical connections from the cable through the motor for applying a regulable electro-motive force tending to cause the rotation of the motor and reel in one direction, and electrical connections from the cable through the motor for applying a regulable lesser electro-motive force tending to cause the rotation of the motor and reel in the other direction.

9. The combination in an electric locomotive of a main propelling motor, a cable reel, a cable adapted to be wound upon the reel and connected for the transmission of current to the said motor, an independent reel motor, electrical connections from the cable through the reel motor, and manually controllable means for applying the torque of the motor to tend to rotate the reel in either direction.

10. The combination in an electric locomotive of a main propelling motor, a cable reel, a cable adapted to be wound upon the reel and connected for the transmission of current to the said motor, an independent reel motor, electrical connections from the cable through the motor, and means for applying the torque of the motor to tend to rotate the reel in one direction and for applying the torque of the motor to tend to a lesser extent to rotate the reel in the other direction.

11. The combination in an electric locomotive of a main propelling motor, a cable reel, a cable adapted to be wound upon the reel and connected for the transmission of current to the motor, a dynamo-electric device independent of the motor, power connections between the reel and the dynamo-electric device, electrical connections from the cable through the dynamo electric device for applying to the device an electromotive force serving to cause a torque in the direction to drive the reel in the unwinding direction, the said torque being insufficient to cause actual rotation.

12. The combination in an electric locomotive of a main propelling motor, a cable reel, a cable adapted to be wound upon the reel and connected for the transmission of current to the motor, a dynamo-electric device independent of the motor, power connections between the reel and the dynamo-electric device, electrical connections from the cable through the dynamo electric device for applying to the device an electromotive force tending to cause its rotation at a definite relatively slow speed in a direction to drive the reel in the unwinding direction, the said device serving as a retarder when driven by the reel at a greater speed.

13. The combination in a locomotive, of a main propelling motor, a cable reel, a cable adapted to be wound upon the reel and connected for the transmission of current to the said motor, an independent reel motor, power connections between the reel motor and the reel, comprising an adjustable friction clutch, and electrical connections between the cable and the reel motor for energizing it to exert a greater torque in one direction than in the other.

14. The combination in an electric locomotive of a main propelling motor, a cable reel, a cable adapted to be wound upon the reel and connected for the transmission of current to the said motor, an independent reel motor, power connections between the reel motor and the reel, an electrical connection from the cable through the reel motor for energizing it for rotation in one direction, an electrical connection from the cable through the reel motor for energizing it for rotation in the other direction, one of the said connections having a resistance considerably greater than that of the other, and means for bringing either of the said connections into operation.

15. The combination in an electric locomotive of a main propelling motor, a cable reel, a cable adapted to be wound upon the reel and connected for the transmission of current to the said motor, an independent reel motor, power connections between the reel motor and the reel, an electrical connection from the cable through the reel motor for applying electromotive force tending to cause the rotation of the motor and the reel in the cable winding direction, an electrical connection from the cable through the motor for applying electromotive force tending to cause the rotation of the motor and the reel in the cable unwinding direction, the resistance of the said second connection being considerably greater than the resistance of the first connection, and means for bringing either of the said connections into operation.

In testimony whereof I affix my signature, in presence of two witnesses.

GLOVER F. PERIN.

Witnesses:
L. P. CAMPBELL,
J. R. O'HARA, Jr.

---

Copies of this patent may be obtained for five cents each, by addressing the "Commissioner of Patents Washington, D. C."